(12) United States Patent
Mondal et al.

(10) Patent No.: US 8,619,542 B2
(45) Date of Patent: Dec. 31, 2013

(54) CLOSED-LOOP FEEDBACK IN WIRELESS COMMUNICATIONS SYSTEM

(75) Inventors: Bishwarup Mondal, Oak Park, IL (US); Timothy A. Thomas, Palatine, IL (US)

(73) Assignee: Motorola Mobility LLC, Libertyville, IL (US)

( * ) Notice: Subject to any disclaimer, the term of this patent is extended or adjusted under 35 U.S.C. 154(b) by 303 days.

(21) Appl. No.: 12/958,544

(22) Filed: Dec. 2, 2010

(65) Prior Publication Data

US 2011/0176439 A1    Jul. 21, 2011

Related U.S. Application Data

(60) Provisional application No. 61/295,453, filed on Jan. 15, 2010.

(51) Int. Cl.
*H04J 9/00* (2006.01)
*H04L 5/04* (2006.01)
*H04W 4/00* (2009.01)
*H04K 1/10* (2006.01)

(52) U.S. Cl.
USPC ........... 370/208; 370/203; 370/252; 370/328; 375/260

(58) Field of Classification Search
None
See application file for complete search history.

(56) References Cited

U.S. PATENT DOCUMENTS

| | | | |
|---|---|---|---|
| 7,139,328 B2 * | 11/2006 | Thomas et al. | 375/299 |
| 2007/0191066 A1 * | 8/2007 | Khojastepour et al. | 455/562.1 |
| 2008/0076370 A1 * | 3/2008 | Kotecha et al. | 455/187.1 |
| 2008/0165875 A1 * | 7/2008 | Mundarath et al. | 375/262 |
| 2009/0046805 A1 * | 2/2009 | Kim et al. | 375/295 |
| 2010/0188966 A1 * | 7/2010 | Pun et al. | 370/203 |
| 2011/0002263 A1 * | 1/2011 | Zhu et al. | 370/328 |

OTHER PUBLICATIONS

Texas Instruments: "Implicit Feedback in Support of Downlink MU-MIMO", 3GPP TSG RAN WG1 58bis, R1-093997, Miyazaki, Japan, Oct. 12-16, 2009, all pages.
Samsung: "Further discussions on feedback framework for SU/MU-MIMO", 3GPP TSG RAN WG1 Meeting #58bis, R1-94092, Miyazaki, Japan, Oct. 12-Oct. 16, 2009, all pages.
Samsung: "Explicit Feedback Support for SU/MU-MIMO in LTE-A", 3GPP TSG RAN WG1 Meeting #59, R1-094584, Jeju, Korea, Nov. 9-Nov. 13, 2009, all pages.
Alcatel-Lucent et al.: "Best Companion Reporting for Single-Cell MU-MIMO Pairing", 3GPP TSG RAN WG1 #59 Meeting, R1-094613, Jeju, Korea, Nov. 9-13, 2009, all pages.
Motorola: "Low-Overhead Feedback of Spatial Covariance Matrix", 3GPP TSG RAN1#59, R1-094844, Jeju, South Korea, Nov. 9-13, 2009, all pages.

(Continued)

*Primary Examiner* — Yemane Mesfin
*Assistant Examiner* — Peter Chen

(57) ABSTRACT

A method and apparatus for providing channel feedback is provided herein. During operation a covariance matrix at time t (R) is calculated as a function of a received downlink signal. In order to reduce overhead, R is normalized and quantized. The base unit then uses the covariance matrix estimate to determine appropriate channel beamforming weights, and instructs transmit beamforming circuitry to use the appropriate weights. In an embodiment, circuitry performs a method of calculating a first precoding matrix index I from a codebook using a received signal, calculating a second codebook index J* using the first precoding matrix index I to approximate a covariance matrix and calculating a quantized coefficient $\alpha^*$ to approximate the covariance matrix wherein the quantized coefficient $\alpha^*$ is determined using the first precoding matrix index I.

15 Claims, 6 Drawing Sheets

(56) References Cited

OTHER PUBLICATIONS

Qualcomm Europe: "Extending the UE feedback for efficient MU-MIMO and CoMP", 3GPP TSG RAN WG1 #59, R1-094875, Nov. 9-13, 2009, Jeju, Korea, all pages.

Li, Guangjie et al.: "Proposed Text of DL MIMO Transmission Scheme Section for the IEEE 802.16m Amendment", IEEE 802.16m-09/0331r2, IEEE 802.16 Broadband Wireless Access Working Group, Jan. 7, 2009, all pages.

Qualcomm Europe: "Multiple Description Coding for Spatial Feedback Payload Reduction", 3GPP TSG-RAN WG1 #56, R1-090866, Feb. 9-13, 2009, Athens Greece, all pages.

Philips: "CSI feedback improvements for LTE-A based on multiple codebooks", 3GPP TSG RAN WG1 Meeting #56bis, Tdoc R1-091288, Seoul, Korea, Mar. 23-27, 2009, all pages.

Qualcomm Europe: "Hierarchical feedback in support of downlink CoMP operation", 3GPP TSG-RAN WG1 #58, R1-093110, Aug. 24-28, 2009, Shenzhen, China, all pages.

* cited by examiner

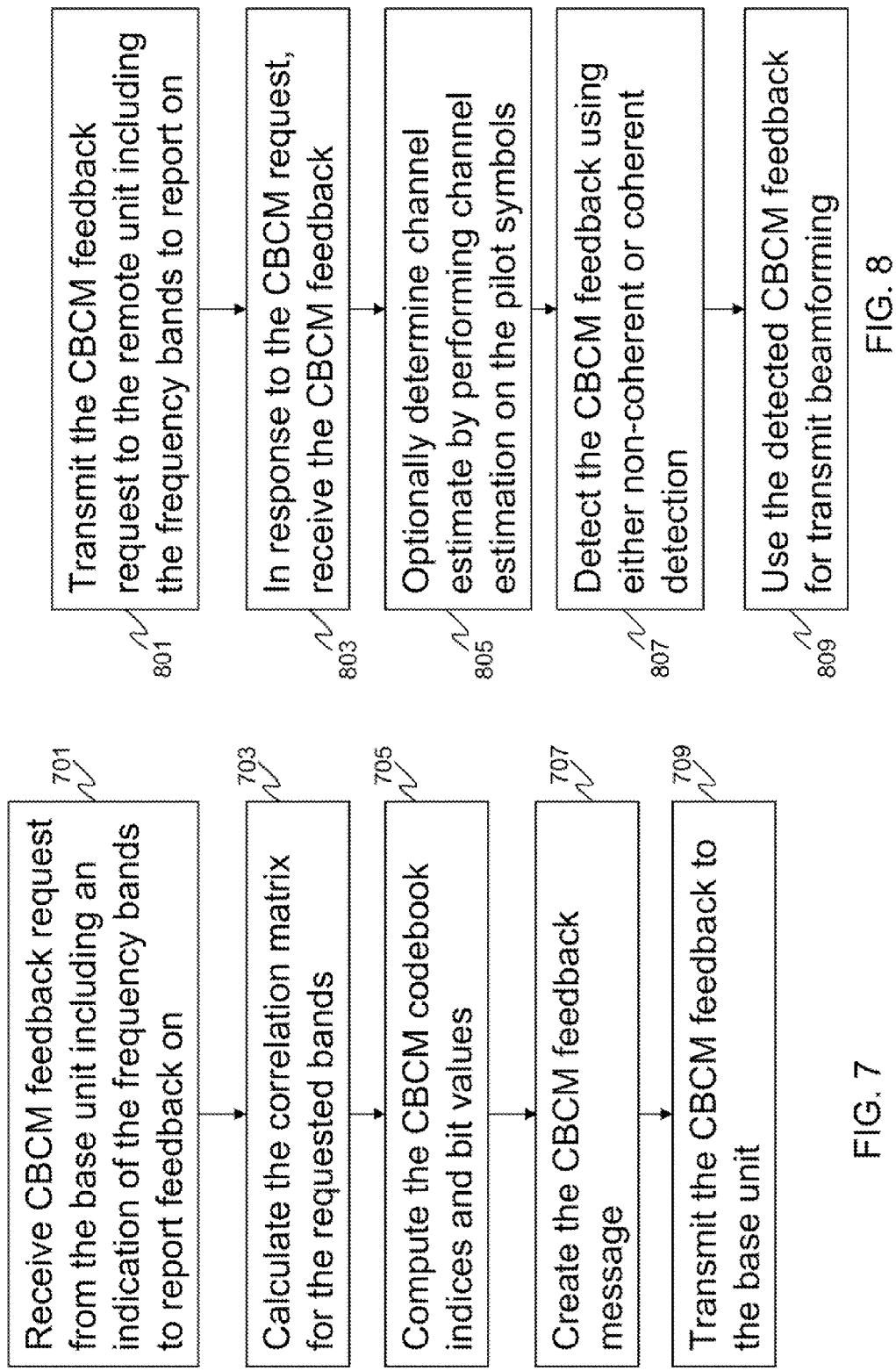

CLOSED-LOOP FEEDBACK IN WIRELESS COMMUNICATIONS SYSTEM

FIELD OF THE DISCLOSURE

The present disclosure relates generally to wireless communications and more particularly to closed-loop transmission feedback in wireless communication systems and methods.

BACKGROUND

In wireless communication systems, transmission techniques involving multiple antennas are often categorized as open-loop or closed-loop, depending on the level or degree of channel response information used by the transmission algorithm. Open-loop techniques do not rely on the information of the spatial channel response between the transmitting device and the receiving device. They typically involve either no feedback or the feedback of the long term statistical information that a base unit may use to choose between different open loop techniques. Open-loop techniques include transmit diversity, delay diversity, and space-time coding techniques such as the Alamouti space-time block code.

Closed-loop transmission techniques utilize knowledge of the channel response to weight the information transmitted from multiple antennas. To enable a closed-loop transmit array to operate adaptively, the array must apply the transmit weights derived from the channel response, its statistics or characteristics, or a combination thereof. There are several methodologies for enabling closed-loop transmission. These are discussed in the context of the downlink of a cellular communication system in which a base station (BS) (sometimes referred to as a base unit or access point or node-B or eNode-B) with multiple antennas transmits to a mobile station (MS) (sometimes referred to as a mobile or remote unit or user equipment or UE) having one or more receive antennas and one or more transmit antennas. The MS may not necessarily have the same number of transmit antennas as receive antennas. Exemplary closed-loop methodologies include adaptive transmit beam-forming, closed-loop single-user MIMO, closed-loop multi-user MIMO, and coordinated multi-point transmission (or CoMP). In these examples, the transmitter applies weighting coefficients that are derived according to an optimization algorithm to control characteristics of the transmitted signal energy.

One methodology for enabling closed-loop transmission is codebook index feedback in which both the BS and MS maintain one or more finite codebooks of possible transmit weight vectors or matrices, depending on the number of simultaneous transmit beams being formed. The MS measures the downlink multi-antenna channel response and computes the transmit weight vector or matrix that is best suited to transmit information to itself. Specifically a MS chooses the best transmit weight vector or matrix to optimize the data reception performance when the same transmit weight vector or matrix is used by the BS to transmit data to the MS. An MS may also choose multiple elements (vectors or matrices) from one or more codebooks and combine them to construct a single transmit weight vector or matrix. While choosing multiple elements the goal is to optimize the data reception performance when the transmit weight vector or matrix as constructed from the combination is used by the BS to transmit data to the MS. The MS then transmits the index into the codebook back to the BS, where the index into the codebook is often called a Precoding Matrix Index (PMI). The BS uses the transmit weight vector or matrix corresponding to the index fed back by the MS. The particular codebook that a MS and a BS uses may change from time to time. The BS has the flexibility to change the transmit weight vector or matrix recommended by the MS for transmission. Codebook index feedback can be applied to both frequency division duplex (FDD) and time division duplex (TDD) systems. The PMI based codebook feedback methods are used with a CQI and a rank indication (RI) feedback. The CQI represents the modulation and coding scheme (MCS) of the transport blocks and includes the effect of precoding as will as receiver processing. The rank indication (RI) represents the rank of the precoding matrix that maximizes the data-rate.

Another methodology for enabling closed-loop transmission is direct channel feedback (DCFB), wherein the MS measures the downlink channel response and encodes that channel response as an analog signal to be conveyed on the uplink. The downlink channel response estimates are encoded along with known pilot signals that enable the BS to estimate the analog values of the downlink channel estimates. DCFB can be applied to both FDD and TDD systems.

Another methodology for enabling closed-loop transmission is analog covariance matrix or analog eigenvector feedback. In covariance feedback the MS measures the downlink channel response, computes a covariance matrix for the band of interest, and then feeds back the values of the covariance matrix in an analog fashion to the BS. For eigenvector feedback, the MS obtains a covariance matrix similar to that of covariance feedback but then computes the dominant eigenvector or eigenvectors of the covariance matrix and feeds back the eigenvector or eigenvectors in an analog fashion to the BS.

Another methodology for enabling closed-loop transmission is quantized eigenvector feedback. In this method the eigenvectors of the channel covariance matrix is quantized (using vector quantization) to one or more vectors or matrices and sent back to the BS. The objective for the quantization method is to accurately represent the dominant eigenvectors of the covariance matrix.

Yet another methodology for enabling closed-loop transmission is to quantize the elements of the covariance matrix by a fixed number of bits with fixed and predefined amplitude and phase range. Specifically the quantization function that maps an unquantized value or a set of values to a quantized value or a set of values is predefined and fixed for a given size of the covariance matrix. In addition the quantization of one element of the covariance matrix or a set of elements of the covariance matrix does not depend on the quantization of the elements outside the set. Then the MS feeds back the fixed number of bits and the BS is able to get a one-time estimate of the covariance matrix which tends to have fairly high quantization error.

Another methodology for enabling closed-loop transmission is to use codebook based feedback for quantization of a covariance matrix. The codebooks contain vectors or matrices that are predetermined and known to the BS and the MS. A covariance matrix is estimated at the MS and is quantized using a combination (or function) of vectors or matrices with the same rank weighted by scalars. Specifically a weighted sum of the outer products of vectors or matrices with the same rank is used to represent a covariance matrix. In this case the spatial channel information is conveyed by multiple codebook indices and one or more scalars. Along with the spatial information, a CQI representing the quality of the channel without precoding may be fed back to help determine MCS at the BS. A rank indication (RI) representing the rank of precoding may or may not be fed back.

The codebook-based techniques described above can be classified into two groups—(i) PMI based methods that do not provide the rich channel information provided by covariance feedback but these methods are compatible with CQI feedback representing MCS of the transport blocks including the effect of precoding and receiver processing and (ii) the covariance quantization based methods that are not compatible with CQI and rank indication feedback representing the MCS of the transport blocks including the effect of precoding. Hence a method is needed to obtain the channel quality of covariance-based feedback with the simple and elegant feedback of the codebook-based methods and which is compatible with CQI feedback representing MCS of the transport blocks including the effect of precoding and receiver processing and RI feedback representing the rank of precoding.

BRIEF DESCRIPTION OF THE DRAWINGS

FIG. 7 is a flow chart showing operation of the CBCM feedback process at a remote unit.

FIG. 8 is a flow chart showing operation of requesting and receiving CBCM feedback at a base unit.

Figure 1:
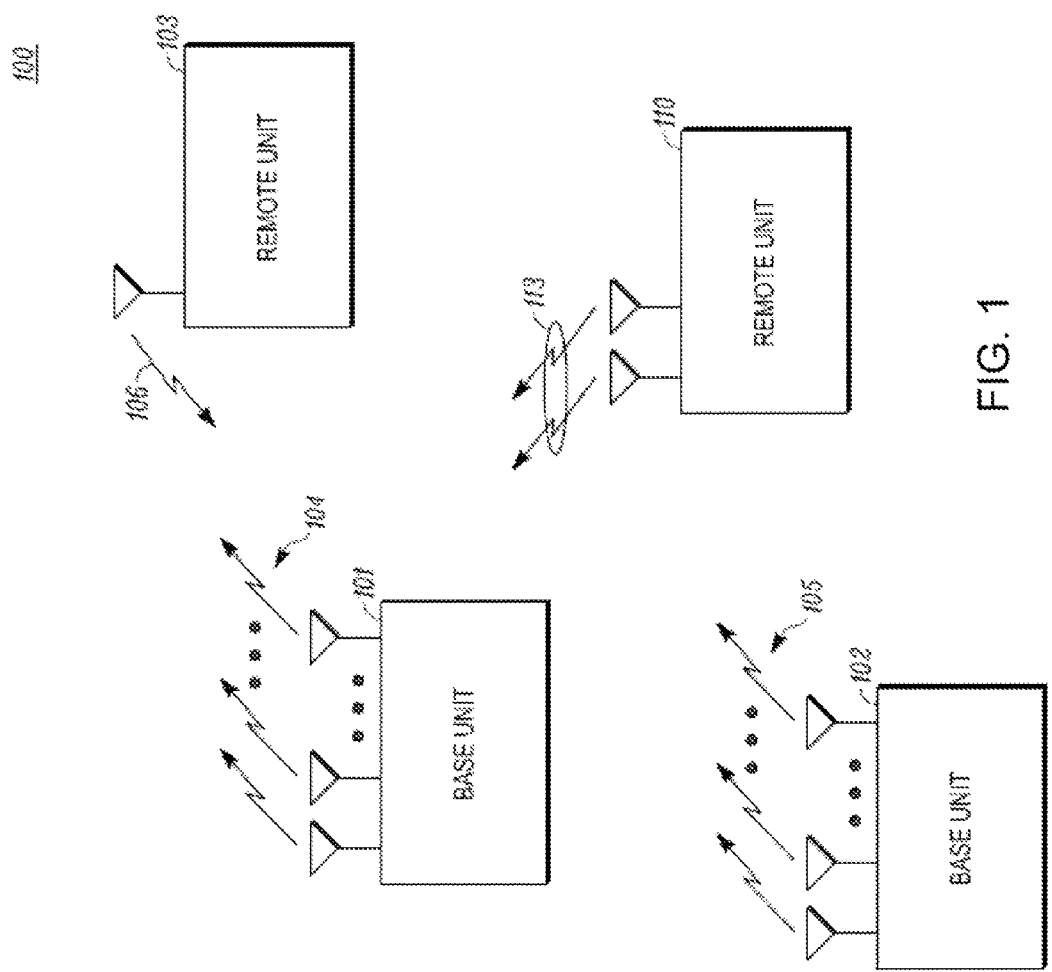
FIG. 1 is a wireless communication system.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

In order to address the above-mentioned issues, a method and apparatus for providing channel feedback is provided herein. During operation a covariance matrix at time t (R) is calculated as a function of a received downlink signal. In order to reduce overhead, R is normalized and quantized. The base unit then uses the normalized and quantized covariance matrix estimate to determine appropriate channel beamforming weights, and instructs transmit beamforming circuitry to use the appropriate weights.

In an embodiment, the method and apparatus discussed includes a transceiver coupled to a codebook based covariance matrix circuitry. The circuitry performs the method of calculating a first precoding matrix index I from a codebook using a received signal, calculating a second codebook index J* using the first precoding matrix index I to approximate a covariance matrix and calculating a quantized coefficient α* to approximate the covariance matrix wherein the quantized coefficient α* is determined using the first precoding matrix index I. The first precoding matrix index I, the second codebook index J* and the quantized coefficient α* are transmitted by the transceiver.

In another embodiment, the method and apparatus discussed below includes a transceiver coupled to a codebook based covariance matrix detection circuitry. The transceiver receives a codebook based covariance matrix feedback message. The circuitry is configured to determine a first precoding matrix index I, a second codebook index J* and a quantized coefficient α* from the codebook based covariance matrix feedback message, and determine channel beamforming weights using the first precoding matrix index I, the second codebook index J* and the quantized coefficient α*.

In FIG. 1, the wireless communication system 100 includes one or more fixed base infrastructure units forming a network distributed over a geographical region. The base unit may also be referred to as an access point, access terminal, BS, Node-B, eNode-B, or by other terminology used in the art. In FIG. 1, the one or more base units 101 and 102 serve a number of remote units 103 and 110 within a serving area, for example, a cell, or within a cell sector. In some systems, one or more base units are communicably coupled to a controller forming an access network that is communicably coupled to one or more core networks. The disclosure however is not intended to be limited to any particular wireless communication system.

Generally, the serving base units 101 and 102 transmit downlink communication signals 104 and 105 to remote units in the time and/or frequency domain. Remote units 103 and 110 communicate with one or more base units 101 and 102 via uplink communication signals 106 and 113. The one or more base units may comprise one or more transmitters and one or more receivers that serve the remote units. The remote units may be fixed or mobile user terminals. The remote units may also be referred to as subscriber units, mobile stations (MSs), users, terminals, subscriber stations, user equipment (UE), user terminals, or by other terminology used in the art. The remote units may also comprise one or more transmitters and one or more receivers. The remote units may have half duplex (HD) or full duplex (FD) transceivers. Half-duplex transceivers do not transmit and receive simultaneously whereas full duplex terminals do.

In the preferred embodiment, the communication system utilizes orthogonal frequency division multiple access (OFDMA) or a multi-carrier based architecture on the downlink and for uplink transmissions. Exemplary OFDMA based protocols include the Long Term Evolution (LTE) of the 3GPP UMTS standard and IEEE 802.16 standard. Although the preferred embodiment utilized OFDMA, other modulation methods may also be employed such as interleaved frequency-division multiple access (IFDMA), DFT spread OFDM, multi-carrier code-division multiple access (MC-CDMA), multi-carrier direct sequence CDMA (MC-DS-CDMA), Orthogonal Frequency and Code Division Multiplexing (OFCDM), or cyclic-prefix single carrier.

Figure 2:
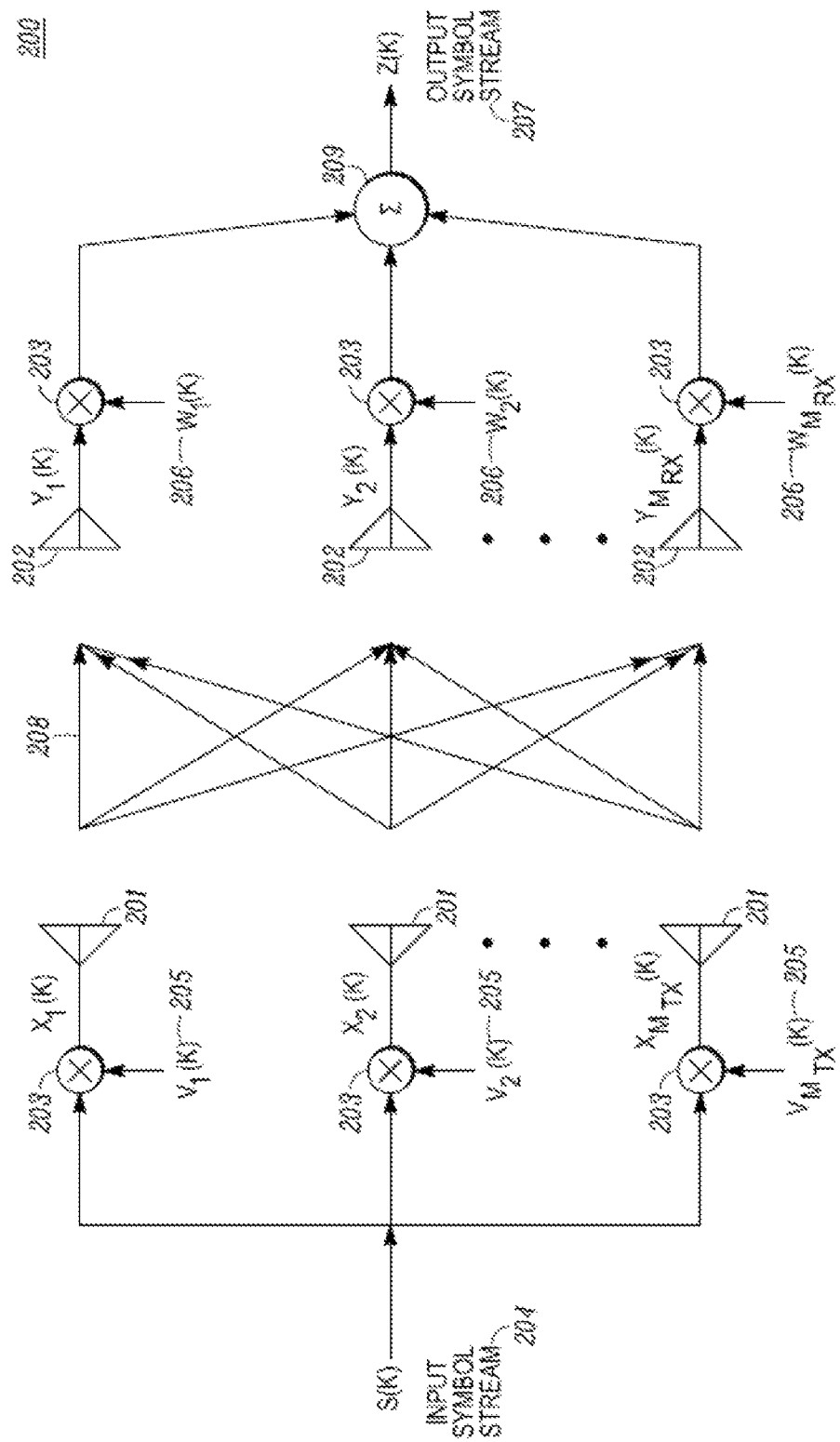
FIG. 2 is a block diagram of a closed-loop transmit antenna array communicating a single data stream to a receiving device.

FIG. 2 is a block diagram of a closed-loop transmit antenna array as part of a base unit communicating a single data stream to a receiving device as part of a remote unit having one or more receive antennas. Input stream 204 is multiplied by transmit weights 205 using multipliers 203 before being fed to the multiple transmit antennas 201. Multiplying input stream 204 by transmit weights 205, where the transmit weights are based on at least a partial channel response, is an example of tailoring a spatial characteristic of the transmission. The transmit weights can be calculated from fed-back information such as the covariance matrix or eigenvectors using a method known in the art. The signals transmitted from the multiple transmit antennas 201 propagate through a matrix channel 208 and are received by multiple receive antennas 202. The signals received on the multiple receive antennas 202 are multiplied by receive weights 206 using multipliers 203 and summed by a summation device 209 to produce an output symbol stream 207. In embodiments where the transmitter has only a single antenna, the spatial characteristic of the transmit signal cannot be tailored. However, other characteristics of the transmit signal may be tailored based on at least a partial channel response, such as the complex gain of each sub-carrier (e.g., in a pre-equalization application), or the modulation and coding used on the sub-carriers of the transmit signal.

Figure 3:
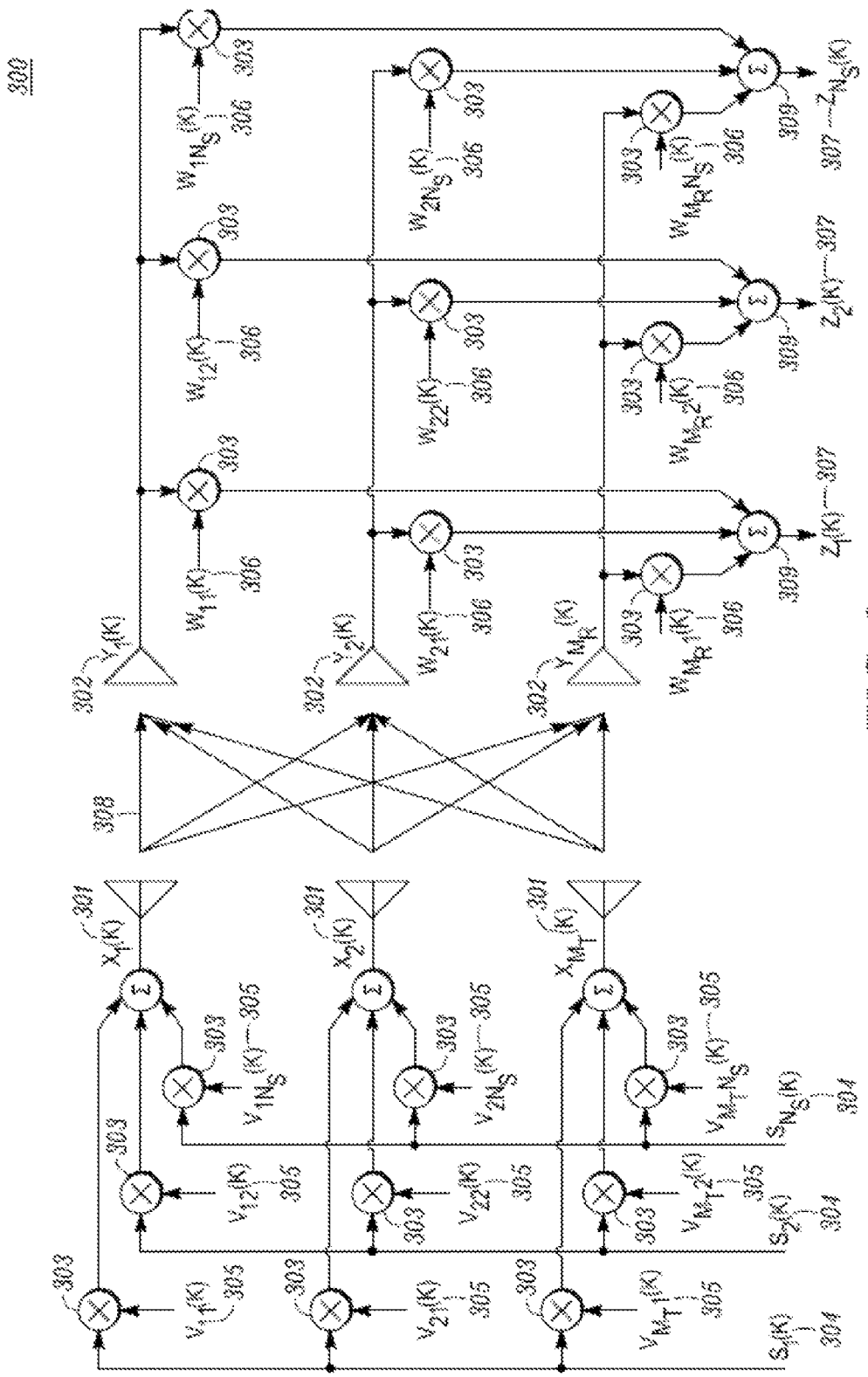
FIG. 3 is a block diagram of a closed-loop transmit antenna array communicating multiple data streams to a receiving device.

FIG. 3 is a block diagram of a closed-loop transmit antenna array as part of a base unit communicating multiple data streams to a remote unit having one or more receive antennas, for example, a MIMO system. Multiple input streams 304 are multiplied by transmit weights 305 using multipliers 303 before being fed to the multiple transmit antennas 301. The signals transmitted from the multiple transmit antennas 301 propagate through a matrix channel 308 and are received by multiple receive antennas 302. The signals received on the multiple receive antennas 302 are multiplied by receive weights 306 using multipliers 303 and summed by summation devices 309 to produce the multiple output symbol streams 307. Multiplying input streams 304 by transmit weights 305 where the transmit weights are based on at least a partial channel response is another example of tailoring a spatial characteristic of the transmission. Other schemes for producing the output symbol streams 307 are possible, such as maximum likelihood detection or successive cancellation that may or may not use the receive weights 306 and the multipliers 303.

Figure 4:
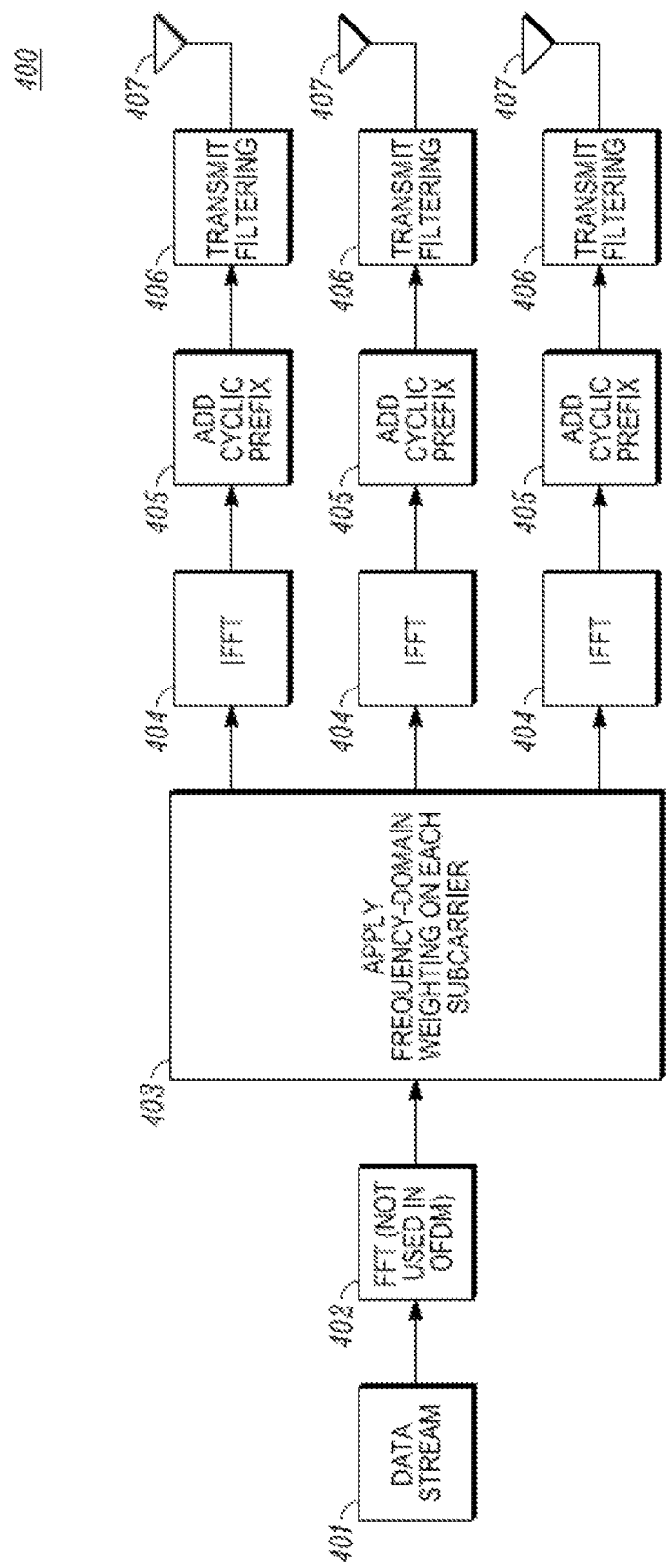
FIG. 4 is a block diagram of a frequency domain-oriented broadband transmission system employing a closed-loop transmit antenna array.

FIG. 4 is a block diagram of a frequency-domain oriented transmission system such as OFDM or cyclic prefix single carrier (CP-Single Carrier) in which the transmission techniques of FIG. 2 and FIG. 3 are performed in the frequency domain prior to transmission. In a CP-Single Carrier system, one or more data streams 401 are first brought into the frequency domain with one or more fast Fourier transforms (FFTs) 402 and the frequency domain data streams are weighted with frequency domain weighting apparatus 403. In OFDM, the one or more data streams 401 are sent directly to frequency domain weighting apparatus 403 without the use of FFT 402. The frequency domain weighting apparatus 403 implements the weighting function shown in the transmit portion of FIG. 2 and FIG. 3 on each sub-carrier or frequency bin in the frequency domain. Thus, the transmit signal can be tailored either spatially, or in frequency, or both with this type of a system. The outputs of the frequency domain weighting apparatus 403 are then brought back into the time domain with IFFTs 404. Cyclic prefixes are added 405 as is known in the art. Transmit filtering 406 is then performed before sending the transmitted signals to the transmit antennas 407.

A more detailed explanation of the codebook-based covariance matrix (CBCM) feedback method is now provided. A spatial covariance matrix or more generally 'spatial transmit covariance matrix' captures the correlations between various transmit antennas as experienced in a certain propagation environment. It also captures the received power at the terminal corresponding to each transmit antenna. An instantaneous covariance matrix can be defined for each data subcarrier based on the downlink channel estimates available at a time instant (hence can also be referred to as short-term covariance matrix)

$$R_i = H_i^H H_i$$

where $H_i$ is the $N_R \times N_T$ channel matrix estimated by the terminal on the downlink where $N_R$ is the number of receive antennas at the MS and $N_T$ is the number of transmit antennas at the BS. $H_i^H$ denotes the conjugate transpose of $H_i$ and $(.)^H$ denotes the Hermitian operator for a vector or matrix henceforth. A remote unit can accumulate or average the per-sub-carrier instantaneous or short-term covariance matrix over multiple subcarriers. A narrow band covariance matrix is accumulated over subcarriers that encompass a small portion of the operational bandwidth (sometimes referred to as "sub-band"). A wideband or broadband covariance matrix is accumulated over the entire band or a large portion of the band. A remote unit can also accumulate an instantaneous covariance matrix over time to obtain a long-term statistical spatial covariance matrix. In another form, a remote unit may compute the above estimate by including only the rows in the channel matrix corresponding to a subset of the receive antennas on which measurements are available. Also note that a remote unit may obtain the covariance matrix without having to estimate the channel explicitly, for example, by correlating the received pilots sent from each transmit antenna. In an alternate embodiment, the spatial covariance matrix may be replaced by an Hermitian matrix. The coefficients of the Hermitian matrix may be analog (meaning not quantized and coded or modulated with a digital modulation technique e.g. QPSK, QAM) and may or may not be a direct function of the spatial covariance matrix. Examples of such matrices include $\sigma^2 I$, $R + \sigma^2 I$ where I is an $N_T \times N_T$ identity matrix, $\sigma^2$ is a real scalar and R is an $N_T \times N_T$ spatial covariance matrix.

As suggested above, the base unit uses a fed-back spatial covariance matrix or matrices to compute transmit weights and for other purposes as will become more fully apparent from the discussion herein. In one embodiment, the remote unit computes the spatial covariance matrix based on a measured downlink matrix channel response. The computation of spatial covariance matrices is known generally by those having ordinary skill in the art. The present disclosure is not intended to be limited to any particular method or technique of computing a spatial covariance matrix. In some implementations, the base unit indicates which portion of the operational bandwidth for which the one or more spatial covariance matrices should be computed by the remote unit. This indication could be explicit or implied.

In one implementation, the remote unit computes one or more spatial covariance matrices and transmits a representation thereof to the base unit using multiple time intervals. In one embodiment, the base unit uses the spatial covariance matrix or matrices received from the remote unit to compute beamforming weights (i.e., complex-valued weighting factors for each transmit antenna). In one embodiment, a base unit may use the covariance matrix accumulated over the entire band (or dominant eigenvector(s) computed from the covariance matrix accumulated over the entire band) for computing the beamforming weights that will then be the same on all subcarriers. In another embodiment, a base unit may use the covariance matrix specific to a portion of the band (or the dominant eigenvector(s) computed from the covariance matrix specific to a portion of the band) for beamforming only in the corresponding portion of the band. In one embodiment, the base unit may request periodic feedback of the covariance matrix corresponding to a portion of the band or its entirety or both. In another embodiment, the base unit commands the remote unit to compute and feedback the covariance matrix or matrices on an as-needed basis or on a periodic basis. The identity of the bands corresponding to a covariance matrix that is fed back may be indicated by the eNodeB, determined by the MS or configured by higher-layer signaling.

In another embodiment, the base unit uses a covariance matrix or matrices that is (are) fed back from the remote unit to compute multiple transmit weight vectors for use in multi-stream beamforming or closed-loop MIMO applications where multiple spatial channels are simultaneously formed (one formed by each transmit weight vector) so as to realize a spatial multiplexing gain on the time-frequency resources used for transmission to the mobile unit. The remote unit receiving transmission may or may not be served by the base-unit. A serving base unit for a particular remote unit is defined as one that transmits primary control information to the remote unit. When the remote unit is not served by the base-unit, the transmission may be referred to as a coordinated multi-point (COMP) transmission.

In another embodiment, the base unit uses the covariance matrices fed back from multiple remote units to compute multiple transmit weight vectors for the purpose of realizing multi-user MIMO (MU-MIMO) transmission (also called transmit Spatial Division Multiple Access (SDMA)) to multiple remote units simultaneously on the same time-frequency resources. One or more of the remote units receiving transmission may not be served by the base-unit. When the remote unit is not served by the base-unit, the transmission may be referred as a coordinated multi-point (CoMP) transmission.

In another implementation, the remote unit computes multiple spatial covariance matrices for the set of multiple covariance matrices that correspond to different portions of the operational band, and transmits the matrices to the base unit per the allocation by the base unit. In one embodiment, the base unit uses the spatial covariance matrices received from the remote unit to compute transmit weights for frequency selective scheduling (FSS) applications. The group of subcarriers (frequency band) that are used to derive spatial covariance matrices can be chosen by a remote unit or by a base unit. The time gap from one feedback of this information to the next feedback can be decided by a remote unit or by a base unit based on factors such as remote unit moving speed, SNR, etc.

In another implementation a BS may send or receive a covariance matrix (fed back by a MS) from another BS through an in-band or out-of-band backhaul link. A BS may determine transmit weights for one or more served MSs using multiple covariance matrices received in this fashion from other BSs.

A covariance matrix feedback is obtained by summing the per-subcarrier covariance matrix defined as $R_i$ above over all the subcarriers in the entire band or a subset of subcarriers associated with a sub-band (or allocation), whose index can be denoted as j in the mathematical expressions below. Such association of a spatial covariance matrix to the entire band or sub-band may be explicitly or implicitly signaled by the base unit.

The spatial covariance matrix accumulated over subcarriers that belong to the $j^{th}$ sub-band can be written as $$R = \sum_{i \in B_j} H_i^H H_i$$

where $B_j$ is the set of subcarriers associated with the band or allocation index. The matrix R is a $N_T \times N_T$ matrix which can be represented as below $$R = \begin{bmatrix} R_{1,1} & R_{1,2} & \cdots & R_{1,N_T} \\ R_{2,1} & R_{2,2} & & R_{2,N_T} \\ \vdots & & \ddots & \\ R_{N_T,1} & R_{N_T,2} & & R_{N_T,N_T} \end{bmatrix}$$

with $N_T^2$ entries where $N_T$ denotes the number of transmit antennas.

The covariance matrix may be normalized and quantized by the remote unit before fed back to the base unit as $$R_q = Q(R/\text{trace}(R))$$

where trace(R) means the sum of the diagonal elements of the matrix R and Q( ) is the quantization function where some example quantization methods are described below. The normalization of a particular covariance matrix can be but need not be done with the same covariance matrix. The remote unit may feedback multiple covariance matrices measured from multiple base units. Moreover, the entire feedback may be sent to one particular base unit. For example in CoMP operation it may be preferable to have a relative power weighting between two or more different covariance matrices that are obtained from different base units to assist in designing transmit weights. For this case the normalization may be done via $$R_q = Q(R/\text{trace}(R_d))$$

where $R_d$ is the covariance matrix derived from a different base unit used to normalize all covariance matrices (i.e., $R_d$ is the covariance matrix of the desired or serving cell/BS). Another option for CoMP operation would be to normalize each covariance matrix by the trace of itself and then the mobile can send back additional information to track the power differences between each covariance matrix.

In a preferred embodiment, as a first step, a PMI, CQI and RI is determined by a MS from an estimated covariance or otherwise using techniques known in the literature such as those standardized by LTE Rel-8 or other wireless communication standards. In one such method a rank-1 precoding vector denoted by $V_1$ may be determined as $$V_1 = \underset{W \in C_1}{\text{argmax}}\, \gamma_1(W), \text{ where } \gamma_1(W) = ESM_{k \in K}\left(\frac{W^H H_k^H H_k W}{\sigma_k^2}\right)$$

where $C_1$ is a set of rank-1 vectors also known as a rank-1 codebook, K is the set of subcarriers over which a PMI/CQI/RI is computed and ESM represents a function that combines the per-tone-SINR into an effective SINR, $H_k$ denotes the estimated channel in subcarrier-k, and $\sigma_k^2$ denotes the estimated noise and interference power in subcarrier-k.

Similarly, a rank-2 precoding matrix denoted by $V_2$ may be determined as $$V_2 = \underset{W \in C_2}{\mathrm{argmax}}\{\log(1 + \gamma_{2,1}(W)) + \log(1 + \gamma_{2,2}(W))\},$$

where $$\gamma_{2,1}(W) = ESM_{k \in K}\left(\frac{1/(2\sigma_k^2)}{[W^H H_k^H H_k W + 2\sigma_k^2 I]_{11}^{-1}} - 1\right),$$

$$\gamma_{2,2}(W) = ESM_{k \in K}\left(\frac{1/(2\sigma_k^2)}{[W^H H_k^H H_k W + 2\sigma_k^2 I]_{22}^{-1}} - 1\right)$$

where $C_2$ is a set of rank-2 matrices also known as a rank-2 codebook, K is the set of subcarriers over which a PMI/CQI/RI is computed and ESM represents a function that combines the per-tone-SINR into an effective SINR, $H_k$ denotes the estimated channel in subcarrier-k, and $\rho_k^2$ denotes the estimated noise and interference power in subcarrier-k.

If the MS is capable of receiving only rank-1 and rank-2 transmission then the MS estimates two data-rates corresponding to $V_1$ and $V_2$. If the data-rate corresponding to $V_1$ is higher than the data-rate corresponding to $V_2$ then RI indicates rank=1, otherwise RI indicates rank=2. If RI indicates rank=1 then the index of $V_1$ within $C_1$ is determined as the PMI, otherwise the index of $V_2$ within $C_2$ is determined as the PMI. If RI indicates rank=1, a CQI is derived from $\gamma_1$ ($V_1$) otherwise one or two CQIs are derived from $\{\gamma_{2,1}(V_2), \gamma_{2,2}(V_2)\}$. The CQI determined in either case includes the effect of precoding as well as receiver processing. In the following this rank-1 or rank-2 PMI is denoted as I. If the MS is capable of receiving rank-3 or higher rank transmissions, the method for determining PMI/CQI/RI described above can extend naturally to include such ranks.

As a second step for rank-1, an additional rank-1 codebook index J* and α* are determined as follows. In case RI indicates rank=1 from the first step above, then J* and α* are determined as, $$J^*, \alpha^* = \underset{J \in C_1', \alpha \in C_0}{\mathrm{argmin}} \left\| \frac{R}{tr(R)} - \left[\frac{1}{1+\alpha} V_1 V_1^H + \frac{\alpha}{1+\alpha} V(:,J) V^H(:,J)\right] \right\|_F^2 \quad (1)$$

where α is a real scalar and can take any value contained in a scalar codebook $C_0$, $V_1$ is the precoding vector from $C_1$ determined from the first step above, V(:,J) denotes a vector (the $J^{th}$ vector) from $C_1'$, and $\|A\|_F^2$ means the sum of the magnitudes of all entries (elements) of matrix A. Similar to $C_1$, $C_1'$ is a set of vectors and forms a rank-1 codebook. $C_0$ is a scalar codebook and in the preferred embodiment contains values between 0 and 1, however the method is not limited to these values.

J* and α* may be determined by exhaustive search. Instead of solving eq. (1) by searching through all possible values of J and α, a simplified search may be performed using the following steps—

$$\text{Evaluate } \beta = \frac{V_1^H R V_1}{\mathrm{trace}(R)} \quad ((2)$$

where

Search rank-1 codebook $C_1': J^* =$  (3)

$$\underset{J \in C_1'}{\max} V^H(:,J)\left[\frac{R}{\mathrm{trace}(R)} - \beta V_1 V_1^H\right] V(:,J)$$

$$\text{Scalar quantization: } \alpha^* = Q'\left\{\frac{V^H(:,J^*)\left[\frac{R}{tr(R)} - \beta V_1 V_1^H\right] V(:,J^*)}{\beta}\right\} \quad (4)$$

where the function Q'( ) above quantizes a real value to the nearest element of $C_0$. The rank-1 codebook index (J*) can be a 4-bit value and the scalar quantization α* can be a 4-bit value, although the method can operate with any number of bits for J* and α*.

The method described above represents a codebook based covariance matrix (CBCM) by a PMI index I, a codebook index J* and a scalar α* in the case RI indicates rank=1. The reconstructed covariance matrix $R_q$ which can be estimated at the eNodeB from I, J* and α* received by the eNodeB from the remote unit is given by $$R_q = \frac{1}{1+\alpha^*} V_1 V_1^H + \frac{\alpha^*}{1+\alpha^*} V(:,J^*) V^H(:,J^*) \quad (5)$$

In case RI indicates rank=2 from the first step, a MS determines a new rank-1 codebook index J* and α* from a cost function that approximates a covariance matrix by a weighted sum of precoding matrices and/or vectors/matrices of different ranks. Examples of such cost functions are given by (6) or (7).

$$J^*, \alpha^* = \underset{J \in C_1', \alpha \in C_0}{\mathrm{argmin}} \left\| \frac{R}{tr(R)} - \left[\frac{1}{2+\alpha} V_2 V_2^H + \frac{\alpha}{2+\alpha} V(:,J) V^H(:,J)\right] \right\|_F^2 \quad (6)$$

$$J^*, \quad (7)$$

$$\alpha^* = \underset{J \in C_1', \alpha \in C_0}{\mathrm{argmin}} \left\| \frac{R}{tr(R)} - \left[\frac{\alpha}{1+2\alpha} V_2 V_2^H + \frac{1}{1+2\alpha} V(:,J) V^H(:,J)\right] \right\|_F^2$$

where α is a real scalar and can take any value contained in a scalar codebook $C_0$ and $V_2$ is the precoding matrix from $C_2$ determined from the first step and V(:,J) denotes a vector from $C_1'$ The values of J* and α* may be determined from (6) or (7) by a joint and exhaustive search using available techniques. In a simplified scheme, however, J* may be set as the rank-1 PMI as described above which is determined by the MS to arrive at a RI determination. Then α* is determined by a search (of 16 values) given by $$\alpha^* = \underset{\alpha \in C_0}{\mathrm{argmin}} \left\| \frac{R}{tr(R)} - \left[\frac{1}{2+\alpha} V_2 V_2^H + \frac{\alpha}{2+\alpha} V(:,J^*) V^H(:,J^*)\right] \right\|_F^2 \quad (8)$$

corresponding to (6) or given by $$\alpha^* = \underset{\alpha \in C_0}{\mathrm{argmin}} \left\| \frac{R}{tr(R)} - \left[\frac{\alpha}{1+2\alpha} V_2 V_2^H + \frac{1}{1+2\alpha} V(:,J^*) V^H(:,J^*)\right] \right\|_F^2 \quad (9)$$

corresponding to (7).

The method described above represents a codebook covariance matrix (i.e CBCM) by a PMI index I, a codebook index J* and a scalar α* in the case RI indicates rank=2. The reconstructed covariance matrix $R_q$ which can be estimated by the eNodeB using the received values I, J* and α* from the remote unit is given by $$R_q = \frac{\alpha}{2+\alpha^*} V(:,J^*)V^H(:,J^*) + \frac{1}{2+\alpha} V_2 V_2^H \qquad (10)$$

according to (6) or given by $$R_q = \frac{1}{1+2\alpha^*} V(:,J^*)V^H(:,J^*) + \frac{\alpha^*}{1+2\alpha^*} V_2 V_2^H \qquad (11)$$

according to (7).

As seen from above, the CBCM can be estimated by the base unit or eNodeB after receiving the codebook indices and a scalar determined by the remote unit. The remote unit determines the PMI, CQI and RI using known methods. Using these determined values, the 4-bit rank-1 codebook index (J*) and the 4-bit quantized coefficient (α*) for the appropriate rank is determined by the remote unit as described above.

In case a MS determines RI to be rank-3 or higher equation (6) or (7) is evaluated with index I representing a rank-3 or higher precoding matrix and an appropriate weighting to ensure a unit trace covariance matrix. Note that the methodology described above for determining I, J*, α* can be easily extended to the case where J* represents a rank-2 or higher rank matrix. Also note that the methodology described above naturally extends to the case where more than two matrices are used to approximate a covariance matrix. In that case multiple codebook indices (in place of J*) and multiple scalar values (in place of α*) are required.

The covariance matrix as mentioned above may also represent a partial covariance matrix (for example in the case of 8 Tx antennas, it could represent a 4×4 submatrix of an 8×8 covariance matrix). It could also represent a covariance matrix after some transformation, e.g. filtering.

The above algorithms provide an elegant means of feeding back a quantized covariance matrix and CQI/RI information that represents the MCS of transport blocks including the effects of precoding and receiver processing. For CoMP operation, it may be desirable to provide relative powers between the covariance matrix of the desired BS and the covariance matrix of the other cells/BSs. One option is for the covariance matrices for all BSs/cells to be quantized as above (with the same normalization) and then an additional feedback value provided by the remote unit which is a quantized power ratio between the desired BS's covariance matrix and the other BS/cell's covariance matrix. Another option, as mentioned above, is to normalize all covariance matrices by the trace of the covariance matrix for the desired BS/cell. In this option the range of quantization of α* may need to change for the other BSs/Cells than the desired one.

Figure 5:
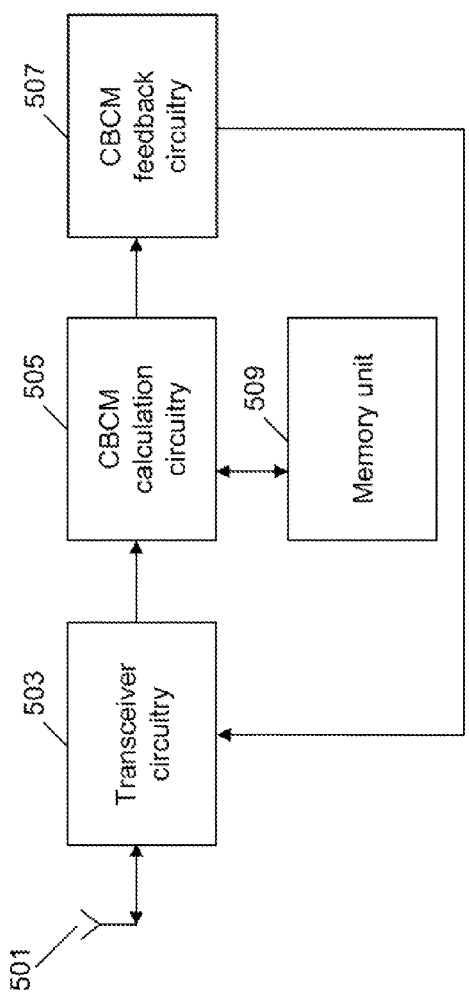
FIG. 5 is a block diagram of a remote unit using the codebook-based covariance matrix (CBCM) feedback method.

FIG. 5 is a block diagram of a remote unit using an uplink feedback channel. Transceiver circuitry 503 receives a CBCM feedback request signal from a base unit on an antenna or an array of antennas 501 along with downlink pilot symbols. The downlink pilot symbols may or may not be transmitted from the serving base station. In response to the CBCM feedback request, the mobile unit using the CBCM calculation circuitry 505 to calculate a covariance matrix (R) at time t as a function of the received downlink pilot symbols. This covariance matrix may be averaged together, with a previous estimate obtained from the memory unit 509. The CBCM calculation circuitry 505 then normalizes and quantizes R using the techniques described above. The CBCM calculation circuitry 505 accomplishes this by determining a PMI index I, a codebook index J* and a quantized scalar α* from R, and using feedback circuitry 507 to feed back the PMI index I and the codebook index J* along with the bit values representing α* by using transceiver 503. In addition to CBCM, CQI and RI may be computed as described above and transmitted.

As shown in FIG. 5, CBCM feedback circuitry 507 is provided to create the specific CBCM feedback waveforms from the CBCM feedback generated by the CBCM feedback calculation circuitry 505. Once the CBCM feedback waveform is created by the CBCM feedback circuitry 507, then the CBCM feedback waveform is sent to the base unit via the transceiver circuitry 503. The operation of sending the CBCM feedback may be repeated two or more times to provide additional CBCM feedback.

Figure 6:
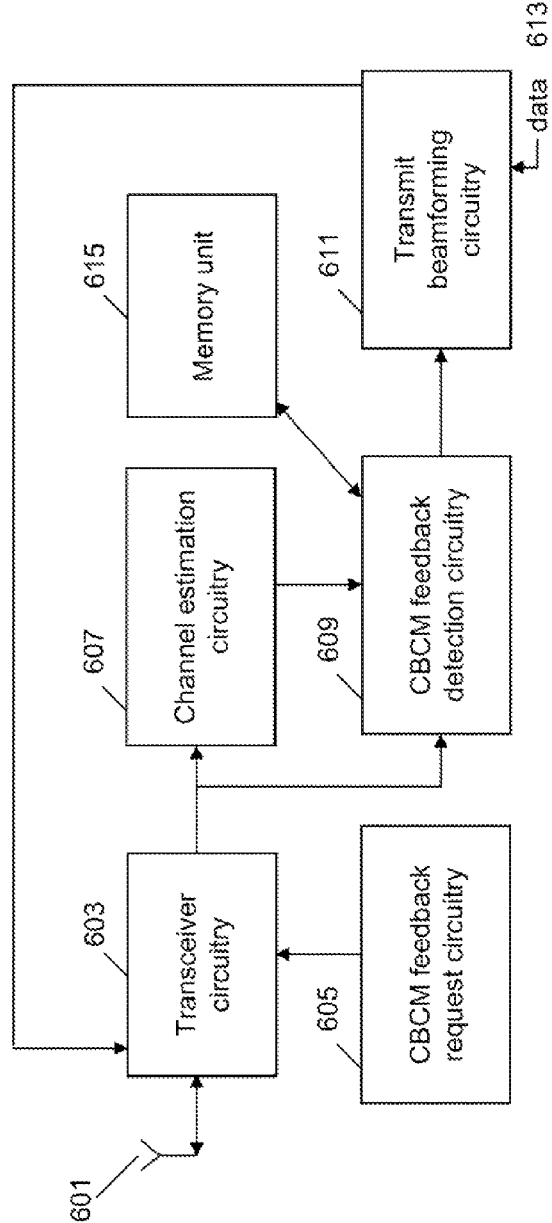
FIG. 6 is a block diagram for a base unit requesting a CBCM feedback subchannel and receiving CBCM feedback from a remote unit.

FIG. 6 is a block diagram of a base unit employing CBCM feedback described above. The base unit first determines that a mobile unit should send CBCM feedback along with the frequencies for the CBCM calculation. This information is sent in a CBCM feedback request signal generated by CBCM feedback request circuitry 605. The CBCM feedback request signal is provided to the transceiver circuitry 603 which sends the signal to the remote unit over an antenna or an array of antennas 601. The CBCM feedback request signal may also include requests for CQI and RI feedback. In addition to the CBCM feedback request signal, requests for CQI and RI feedback may be sent separately.

In addition to the CBCM feedback request signal, pilot symbols might also be sent out of each of the transmit antennas by the transceiver circuitry 603. In response to the CBCM feedback request sent to the remote unit, transceiver circuitry 603 will receive a CBCM feedback signal (consisting of the quantized covariance matrix, $R_q$, which is preferably quantized through the PMI index I and the codebook index J* and the bit values representing quantized scalar α*, and may be quantized in any technique described above) from the mobile unit. The transceiver circuitry 603 will send the received CBCM feedback signal to the CBCM feedback detection circuitry 609 and may optionally send the received CBCM feedback signal to channel estimation circuitry 607 if coherent detection is used on the feedback channel. Channel estimation circuitry 607 will use the pilot symbols optionally contained in the CBCM feedback signal to obtain channel estimates. If coherent demodulation is used, these channel estimates are provided to the CBCM feedback detection circuitry 609 to equalize the data portion of the CBCM feedback signal which contains the PMI index I and the codebook index J* and the bit values representing quantized scalar α* and ultimately compute a covariance matrix estimate from these detected indices and bit values.

If non-coherent demodulation is used, the CBCM feedback detection circuitry 609 estimates the PMI index I and the codebook index J* and the bit values representing α* directly from the CBCM feedback signal. The covariance matrix is then derived directly from these detected indices and bit values.

FIG. 7 is a flow chart showing operation of the mobile unit creating a CBCM feedback waveform (signal or message). The logic flow begins at step 701 where transceiver circuitry 503 receives a request to supply a feedback of channel information. As discussed above, the request is received from a base station and may also contain the frequency bands to report feedback on. At step 703 CBCM feedback calculation circuitry 505 calculates a covariance matrix at time t (R) as a function of a received downlink signal. and then in step 705 calculates the PMI index I and the codebook index J* and the bit values representing α* as described above. (Note that any technique described above may be used to calculate a normalized and quantized value for R). As described above, the value/is determined using known methods for PMI, CQI and RI. The value/can be determined for rank-1 or higher ranks. The determination of the values of J* and α* depend on the value I according to equation (1) for rank-1. For rank-2, the value/determined as in rank-1 is used. The determination of the values of J* and α* uses the value I according to equations (6) or (7). The CBCM values (the codebook indices and the scalar bit values) are then used to create a CBCM feedback message (signal or waveform) by CBCM feedback circuitry 507 and may be transmitted with pilots on a proper feedback channel to a base unit (step 709). In addition to the CBCM feedback message CQI and RI information representing MCS of the transport blocks including the effects of precoding and receiver processing may also be transmitted.

FIG. 8 is a flow chart showing operation of requesting and receiving CBCM feedback at a base unit when the base unit determines that channel information is needed regarding a channel existing between the base unit and a mobile station. The logic flow begins at step 801 where transceiver 603 transmits a CBCM feedback request to a remote unit where the CBCM feedback request includes a frequency band to report on. At step 803, and in response to the request, transceiver 603 receives the feedback (the codebook indices relating to a normalized and quantized value of R, preferably indices I and J* and the bit values representing α*) as a CBCM waveform on a proper feedback channel. Optionally (if coherent detection of the CBCM waveform is used) channel estimation circuitry 607 determines channel estimates from the pilots optionally contained in the feedback channel (step 805). Additionally, CBCM feedback detection circuitry 609 uses non-coherent or coherent detection to detect the CBCM values send by the remote unit and uses the CBCM values to compute a covariance matrix estimate to use for beamforming (step 807). Finally at step 809, CBCM feedback detection circuitry 609 uses the covariance matrix estimate to determine appropriate channel beamforming weights, and instructs transmit beamforming circuitry 611 to use the appropriate weights.

In a preferred embodiment of the present invention, base units and remote units utilizes a network protocol as described by the IEEE 802.16m or 3GPP Long Term Evolution (LTE) standard specification. The following text provides changes to the IEEE 802.16m or 3GPP Long Term Evolution (LTE) standard that facilitate the above-described messaging.

Introduction

In the 3GPP R1 #59 meeting two proposals were made on the feedback requirement for DL MU-MIMO. Proposal-1 states CQI and RI is reported, Rel-8 type of PMI (precoder recommendation) is reported, CQI is determined assuming a hypothetical transmission corresponding to the PMI, which is similar to Rel-8. This allows designs within the scope of Rel-8 type of feedback. Additional feedback for MU-MIMO is not precluded. Proposal-2 includes UE feedback optimized for both SU-MIMO and MU-MIMO. Spatial information feedback is supported where feedback represents downlink channel information rather than being viewed as suggested precoding transmission to eNodeB. Unlike in Rel-8, this feedback facilitates MU-MIMO and CoMP in addition to SU-MIMO. The content and forms of feedback is FFS. Feedback of Rel-8 type PMI can also be supported for SU-MIMO. Details of feedback such as CQI/RI is FFS It was also noted that the two WF proposals are not exclusive. In this paper we consider a possible coexistence of Rel-8 PMI/CQI/RI feedback with explicit feedback. The explicit feedback considered is based on eigenvector feedback or channel direction feedback as proposed in [1][2] where one or more dominant eigenvectors are compressed using vector quantization. The goal of this paper is to emphasize the commonality between the two WF proposals by showing that an explicit feedback may be attained by extending Rel-8 type PMI/CQI/RI feedback.

Extension of Rel-8 PMI/CQI/RI Details

Considering a Rel-8 approach, an UE may determine a 4-bit PMI denoted by I in addition to CQI, RI. Additionally a UE may feedback J* (which is another 4 bit rank-1 PMI) and a scalar α* (quantized to 4 bits between 0 and 1) that extends the PMI feedback to approximate a covariance matrix. Specifically in the case RI indicates rank=1, an eNodeB may estimate a covariance $R_q$ from the formula below—

$$R_q = \frac{1}{1+\alpha^*} V(:,I) V^H(:,I) + \frac{\alpha^*}{1+\alpha^*} V(:,J^*) V^H(:,J^*)$$

Note that the formula above provides a rank-2 approximation of the covariance matrix closely representing the proposal in [1]. The rank-1 vectors identified by I and J* approximate the two dominant eigenvectors and α* indicates the ratio of the two dominant eigenvalues.

Similarly in the case RI indicates rank=2, an eNodeB may estimate a covariance matrix $R_q$ given by—

$$R_q = \frac{1}{2+\alpha^*} V(:,:,I) V^H(:,:,I) + \frac{\alpha}{2+\alpha^*} V(:,J^*) V^H(:,J^*)$$

The determination of the values of J* and α* may be made by the UE without eigenvalue decomposition using the cost function $$J^*, \alpha^* = \underset{J,\alpha}{\operatorname{argmin}} \left\| \frac{R}{tr(R)} - R_q \right\|_F^2$$

An exhaustive search may be performed but some simplifications as mentioned below have been observed to be effective.

In case RI=rank-1, an UE determines CQI, I(rank-1 PMI), and RI according to LTE-Rel8. In addition a rank-1 PMI J* and α* are determined as follows:

$$J^*,$$

$$\alpha^* = \underset{J,\alpha}{\operatorname{argmin}} \left\| \frac{R}{tr(R)} - \left[ \frac{1}{1+\alpha} V(:,I) V^H(:,I) + \frac{\alpha}{1+\alpha} V(:,J) V^H(:,J) \right] \right\|_F^2$$

Instead of solving the above equation by searching through all possible values of J and α, a simplified search may be performed—

Evaluate $\beta = \dfrac{V^H(:,I)RV(:,I)}{tr(R)}$

Search rank-1 codebook $J^* = $ $$\max_J V^H(:,J)\left[\dfrac{R}{tr(R)} - \beta V(:,I)V^H(:,I)\right]V(:,J)$$

Scalar quantization 4-bits: $\alpha^* = $ $$Q\left\{\dfrac{V^H(:,J^*)\left[\dfrac{R}{tr(R)} - \beta V(:,I)V^H(:,I)\right]V(:,J^*)}{\beta}\right\}$$

In case RI=rank-2 the values of $J^*$ and $\alpha^*$ may be determined by an exhaustive search.

The attempt is to emphasize the commonality between the two proposals by showing that:
- An explicit feedback may be attained by extending Rel-8 type PMI/CQI/RI feedback
- Eigenvector feedback or channel direction feedback proposals have been shown as an extension of Rel-8 PMI/CQI/RI by an additional feedback of a 4-bit PMI and a 4-bit scalar (total 12 bits feedback)
- Recommend considering an evaluation methodology including both SU and MU-MIMO to further progress

REFERENCES

[1] R1-094584, Explicit Feedback Support for SU/MU-MIMO in LTE-A (Samsung)
[2] R1-094876, Explicit feedback in support of MU-MIMO operation (Qualcomm)
[3] R1-094683, Views on PMI feedback with uncalibrated eNodeB (Motorola)

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method comprising:
calculating a first precoding matrix index I from a codebook using a received signal;
calculating a second codebook index $J^*$ using the first precoding matrix index I to approximate a covariance matrix;
calculating a quantized coefficient $\alpha^*$ to approximate the covariance matrix wherein the quantized coefficient $\alpha^*$ is determined using the first precoding matrix index I, wherein $J^*$ and $\alpha^*$ are determined as, $$J^*, \alpha^* = \operatorname*{argmin}_{J \in C_1', \alpha \in C_0} \left\| \dfrac{R}{tr(R)} - \left[\dfrac{1}{1+\alpha}V_1 V_1^H + \dfrac{\alpha}{1+\alpha}V(:,J)V^H(:,J)\right] \right\|_F^2$$

where $\alpha$ is a real scalar and takes any value contained in a scalar codebook $C_0$,
$V_1$ is a precoding vector from a rank-1 codebook $C_1$,
$V(:,J)$ denotes a vector (the $J^{th}$ vector) from $C_1'$,
R is the covariance matrix,
$\|A\|_F^2$ is the sum of the magnitudes of all entries of matrix A, and $C_1'$ is a set of vectors and forms a rank-1 codebook, and
transmitting a codebook based covariance matrix using the first precoding matrix index I, the second codebook index $J^*$ and the quantized coefficient $\alpha^*$.

2. The method of claim 1 wherein the step of calculating a first precoding matrix index I includes determining a Channel Quality Index (CQI) and a Rank Index (RI) using the received signal.

3. The method of claim 1 wherein the quantized coefficient $\alpha^*$ is a function of the second codebook index $J^*$.

4. A method comprising:
receiving a codebook based covariance matrix feedback message;
determining a first precoding matrix index I, a second codebook index $J^*$ and a quantized coefficient $\alpha^*$ from the codebook based covariance matrix feedback message, wherein $J^*$ and $\alpha^*$ are determined as, $$J^*, \alpha^* = \operatorname*{argmin}_{J \in C_1', \alpha \in C_0} \left\| \dfrac{R}{tr(R)} - \left[\dfrac{1}{1+\alpha}V_1 V_1^H + \dfrac{\alpha}{1+\alpha}V(:,J)V^H(:,J)\right] \right\|_F^2$$

where $\alpha$ is a real scalar and takes any value contained in a scalar codebook $C_0$,
$V_1$ is a precoding vector from a rank-1 codebook $C_1$,
$V(:,J)$ denotes a vector (the $J^{th}$ vector) from $C_1'$,
R is the covariance matrix,
$\|A\|_F^2$ is the sum of the magnitudes of all entries of matrix A, and $C_1'$ is a set of vectors and forms a rank-1 codebook, and
determining channel beamforming weights using the first precoding matrix index I, the second codebook index $J^*$ and the quantized coefficient $\alpha^*$.

5. The method of claim 4 wherein the step of determining a first precoding index I includes the step of determining Channel Quality Index (CQI) and a Rank Index (RI) using the received signal.

6. The method of claim 4 wherein the step of determining channel beamforming weights also includes the steps of:
reconstructing a covariance matrix from the first precoding matrix index I, the second codebook index $J^*$ and the quantized coefficient $\alpha^*$;
determining the channel beamforming weights as a function of the reconstructed covariance matrix.

7. The method of claim 4 wherein the step of determining channel beamforming weights includes the step of determining modulation and coding rate.

8. An apparatus comprising:
a transceiver wherein the transceiver receives a signal; and
codebook based covariance matrix circuitry coupled to the transceiver to calculate a covariance matrix from the received signal and wherein the transceiver transmits a feedback and the feedback includes a first precoding matrix index I, a second codebook index $J^*$ and a quantized coefficient $\alpha^*$, wherein $J^*$ and $\alpha^*$ are as, $$J^*, \alpha^* = \operatorname*{argmin}_{J \in C_1', \alpha \in C_0} \left\| \dfrac{R}{tr(R)} - \left[\dfrac{1}{1+\alpha}V_1 V_1^H + \dfrac{\alpha}{1+\alpha}V(:,J)V^H(:,J)\right] \right\|_F^2$$

where $\alpha$ is a real scalar and takes any value contained in a scalar codebook $C_0$,
$V_1$ is a precoding vector from a rank-1 codebook $C_1$, V(:,J) denotes a vector (the $J^{th}$ vector) from $C_1'$,
R is the covariance matrix,
$\|A\|_F^2$ is the sum of the magnitudes of all entries of matrix A, and $C_1'$ is a set of vectors and forms a rank-1 codebook.

9. The apparatus of claim 8 wherein the codebook based covariance matrix circuitry calculates and transmits a Channel Quality Index (CQI) and a Rank Index (RI) using the received signal.

10. The apparatus of claim 8 wherein the second codebook index J* is a function of the precoding matrix index I.

11. The apparatus of claim 8 wherein the quantized coefficient α* is a function of the precoding matrix index I.

12. An apparatus comprising:
a transceiver wherein the transceiver receives a feedback and
codebook based covariance matrix detection circuitry coupled to the transceiver to determine a first precoding matrix index I, a second codebook index J* and a quantized coefficient α* from the feedback, wherein J* and α* are as, $$J^*, \alpha^* = \underset{J \in C_1', \alpha \in C_0}{\operatorname{argmin}} \left\| \frac{R}{tr(R)} - \left[ \frac{1}{1+\alpha} V_1 V_1^H + \frac{\alpha}{1+\alpha} V(:,J) V^H(:,J) \right] \right\|_F^2$$

where α is a real scalar and takes any value contained in a scalar codebook $C_0$,
$V_1$ is a precoding vector from a rank-1 codebook $C_1$,
V(:,J) denotes a vector (the $J^{th}$ vector) from $C_1'$,
R is the covariance matrix,
$\|A\|_F^2$ is the sum of the magnitudes of all entries of matrix A. $C_1'$ is a set of vectors and forms a rank-1 codebook.

13. The apparatus of claim 12 wherein the codebook based covariance matrix detection circuitry includes determining a Channel Quality Index (CQI) and a Rank Index (RI) using the received signal.

14. The apparatus of claim 12 wherein the second codebook index J* is a function of the precoding matrix index I.

15. The apparatus of claim 12 wherein the quantized coefficient α* is a function of the precoding matrix index I.

* * * * *